No. 883,566. PATENTED MAR. 31, 1908.
G. A. PATTILLO.
NUT LOCK.
APPLICATION FILED MAY 3, 1907.
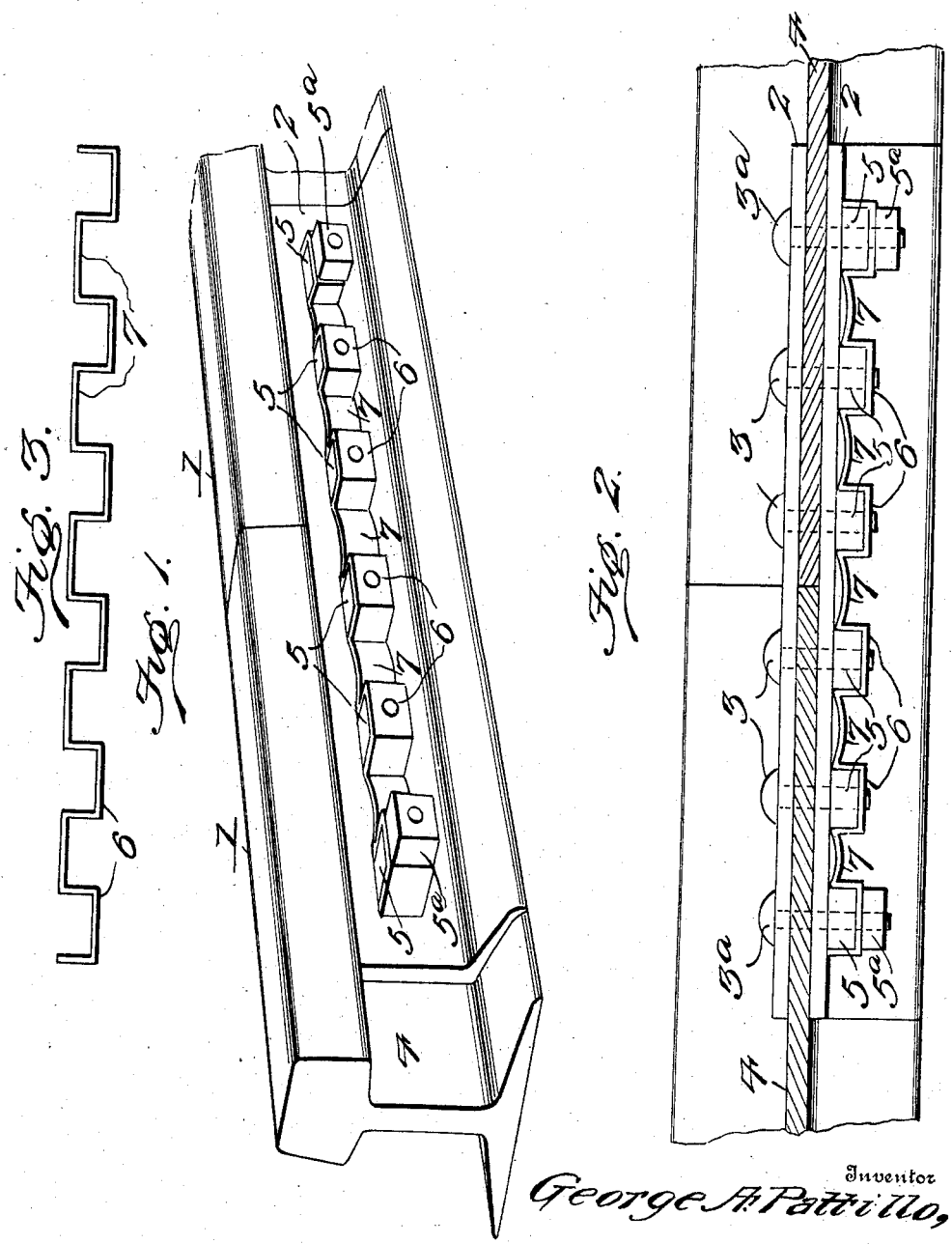

UNITED STATES PATENT OFFICE.

GEORGE A. PATTILLO, OF CARTERSVILLE, GEORGIA.

NUT-LOCK.

No. 883,566.  Specification of Letters Patent.  Patented March 31, 1908.

Application filed May 3, 1907. Serial No. 371,639.

*To all whom it may concern:*

Be it known that I, GEORGE A. PATTILLO, a citizen of the United States of America, residing at Cartersville, in the county of Bartow and State of Georgia, have invented new and useful Improvements in Nut-Locks, of which the following is a specification.

This invention relates to nut locks designed more particularly for use on rail joints, but capable of other uses, and one of the principal objects of the same is to provide a device which will effectually lock a series of nuts upon their bolts, while the nut lock itself is firmly held in position upon the nuts.

Another object of the invention is to provide a nut lock of simple construction which can be produced at slight cost, and which will effectually hold a series of nuts from turning upon their bolts.

These and other objects may be attained by means of the construction illustrated in the accompanying drawings, in which:

Figure 1 is a perspective view of a nut lock made in accordance with my invention, and applied to a series of nuts upon bolts passing through a fish plate upon a rail joint. Fig. 2 is a longitudinal sectional view through the web portions of the rails and looking downward upon the nut lock. Fig. 3 is an edge view of the locking strip.

Referring to the drawing for a more particular description of my invention, the numerals 1 designate the meeting ends of a pair of railway rails, and 2 are the fish plates which may be of any suitable construction. The bolts 3 pass through the fish plates and through the web portions 4 of the rails in the usual manner, and 5 are the nuts secured to the bolts 3.

My nut lock consists of a strip of metal bent to form nut pockets 6 at suitable distances apart to inclose the nuts 5 on the bolts 3, and connecting the nut pockets is the integral portion 7 of the strip. At the ends of the nut lock the bolts $3^a$ are longer than the bolts 3 and said bolts $3^a$ pass through the end pockets for the nuts and are fitted with a nut $5^a$ which firmly secures the nut lock in place and prevents it from moving off the nuts 5.

It will be understood, of course, that a nut lock made in accordance with my invention may be of any required length depending upon the number of nuts to be locked in place, and where the bolts are of a given distance apart, the nut lock strip may be of any required length and cut off to inclose any number of bolts.

Upon reference to Figs. 1 and 2, it will be noted that the integral portion 7 between the nut pockets 6 is slightly curved outward, owing to the fact that the portion 7 is slightly longer than the distance between the nuts 5. The tendency of the portion 7 to straighten out exerts pressure and creates a friction upon the sides of the nuts. This construction holds the nut locks firmly in connection with the nuts.

From the foregoing it will be obvious that a nut lock made in accordance with my invention can be produced at slight cost, will always hold a series of nuts against turning on the bolts, can be quickly attached to the nuts and can be quickly disconnected.

Having thus described the invention, what I claim is:

The herein described nut lock comprising a metal strip bent to form a series of nut pockets having connected integral portions between the pockets of greater length than the distance between the nuts to be bowed to press the sides of the pockets outwardly upon the sides of the nuts and frictionally engage the same, said pockets having bolt apertures therein through which the bolts project, the nuts of the bolts being confined within the pockets, and nuts fitted to the end bolts outside the pockets for holding the locking strip in place.

In testimony whereof, I affix my signature in presence of two witnesses.

GEORGE A. PATTILLO.

Witnesses:
MADISON MILAM,
O. W. REED.